United States Patent
Yoshimura et al.

(10) Patent No.: US 6,647,201 B2
(45) Date of Patent: Nov. 11, 2003

(54) VIDEO AND AUDIO SIGNAL RECORDING AND REPRODUCING DEVICE AND METHOD

(75) Inventors: Kosuke Yoshimura, Kanagawa (JP); Shinichi Suenaga, Kanagawa (JP); Hitoshi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/214,093
(22) PCT Filed: Apr. 24, 1998
(86) PCT No.: PCT/JP98/01909
§ 371 (c)(1),
(2), (4) Date: Dec. 28, 1998
(87) PCT Pub. No.: WO98/49832
PCT Pub. Date: Nov. 5, 1998

(65) Prior Publication Data
US 2003/0156823 A1 Aug. 21, 2003

(30) Foreign Application Priority Data
Apr. 30, 1997 (JP) ............................................... 9-112847

(51) Int. Cl.⁷ .......................... H04N 5/783; H04N 5/781
(52) U.S. Cl. ............................ 386/68; 386/70; 386/125
(58) Field of Search ...................... 386/6–8, 45, 68–70, 386/75, 81–82, 95, 98, 104–106, 125–126; H04N 5/76, 5/781, 5/783

(56) References Cited

U.S. PATENT DOCUMENTS

| | | | | |
|---|---|---|---|---|
| 4,864,428 A | * | 9/1989 | Kanamaru | 386/125 |
| 5,239,430 A | * | 8/1993 | Koishikawa et al. | 360/8 |
| 6,212,330 B1 | * | 4/2001 | Yamamoto et al. | 386/95 |
| 6,222,979 B1 | * | 4/2001 | Willis et al. | 386/68 |
| 6,430,363 B2 | * | 8/2002 | Sasaki et al. | 386/125 |

* cited by examiner

Primary Examiner—Thai Tran
(74) Attorney, Agent, or Firm—Frommer Lawrence & Haug LLP; William S. Frommer; Bruno Polito

(57) ABSTRACT

An audio signal and a video signal are recorded onto a hard disk. In the hard disk, by time-divisionally processing the recording and reproduction, they are executed in parallel. Audio data as much as four fields and corresponding video data as much as one field are constructed as one set and are time-sequentially recorded. In a one-time speed reproduction, the data is reproduced every set. The video data is repetitively reproduced for a period of time of four fields. In a double-speed reproduction, the video data is reproduced every other data and the audio data as much as four fields corresponding to the video data which is reproduced and the audio data as much as subsequent four fields are reproduced. To reproduce the audio data as much as eight fields for a period of time of four fields, the speed of the audio data is converted to a double speed and the audio data is continuously reproduced.

6 Claims, 10 Drawing Sheets

Fig. 1
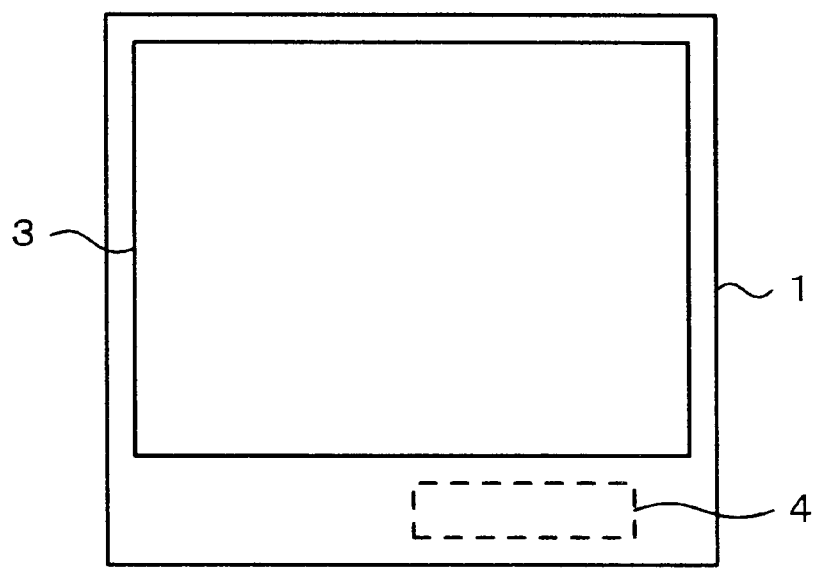
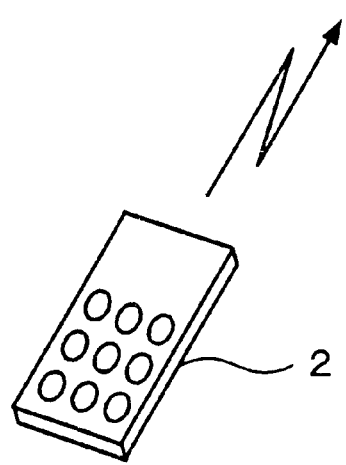

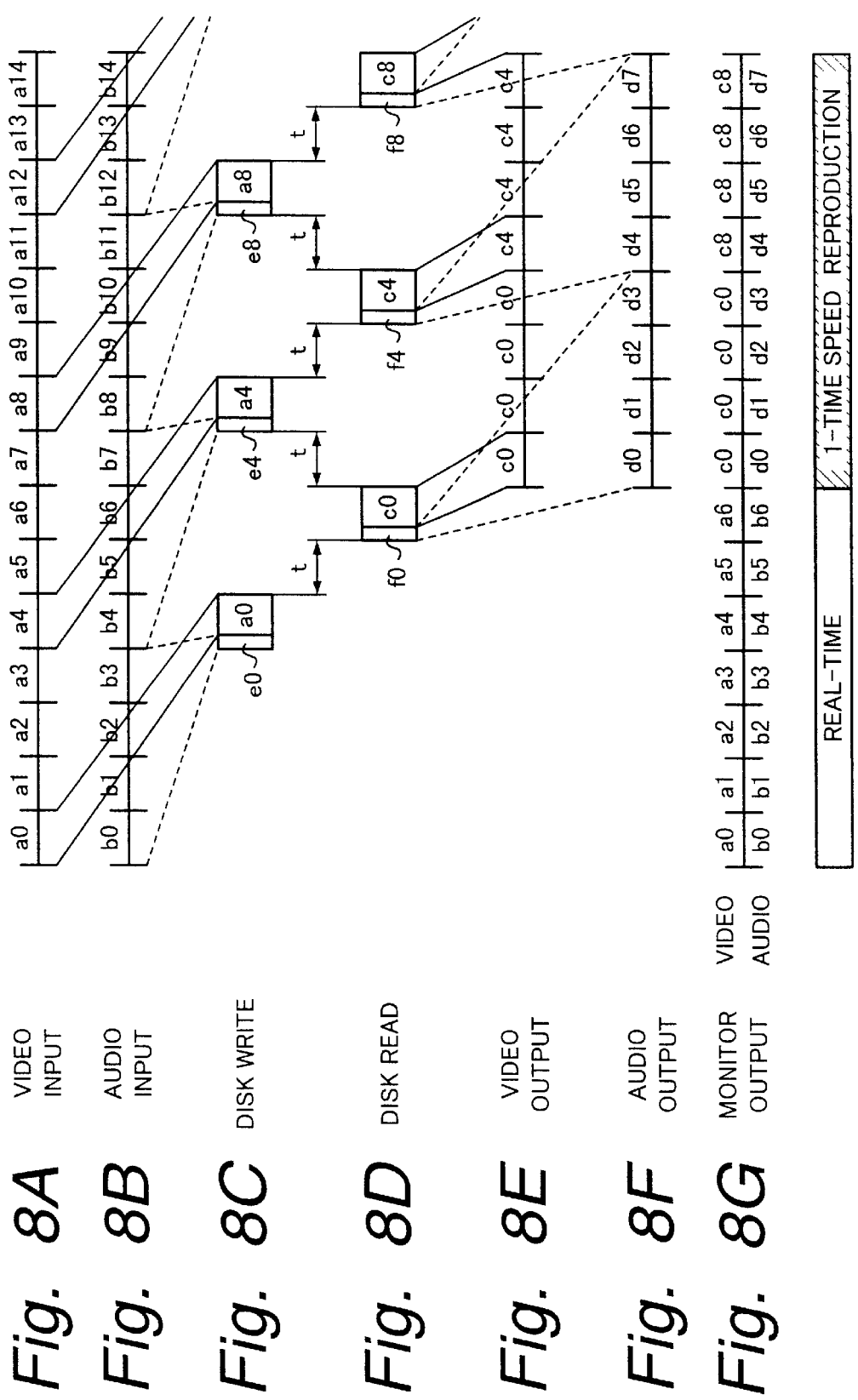

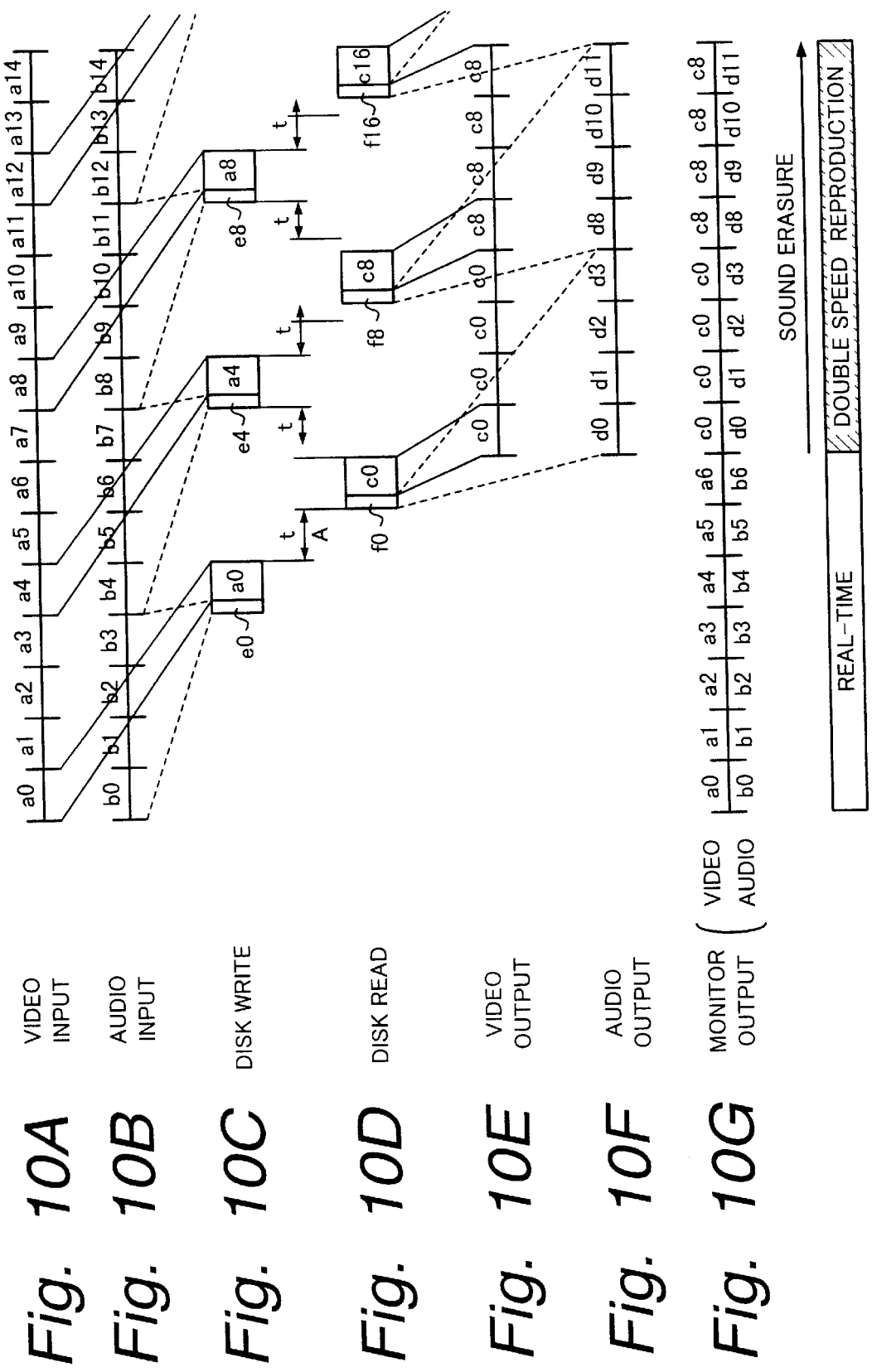

VIDEO AND AUDIO SIGNAL RECORDING AND REPRODUCING DEVICE AND METHOD

TECHNICAL FIELD

The invention relates to a video/audio signal recording and reproducing apparatus and its method in which when video/audio signals recorded on a recording medium are reproduced, even if a double-speed reproduction is performed, all of the audio signals can be read out from the recording medium.

BACKGROUND ART

There are many cases where a telephone call suddenly rings or someone suddenly comes while the user is enjoying a television broadcasting program, so that he overlooks a broadcasting program. If the user overlooked a television broadcasting, this program can never be seen except for a program that is rebroadcasted. It is a rare case that the program is rebroadcasted in a short period of time. A news program and a sports program are not rebroadcasted in most cases. In many cases, therefore, if the user overlooked a television broadcasting program, this program cannot be seen forever.

There is a case where a scene such as good scene of a movie or a drama, interview of an important person, highlight scene of a sports program, or the like which the user wants to preserve suddenly starts during the watching of a broadcasting program. In such a case, even if the user immediately sets a VTR, he misses such a scene and he often cannot record the scene.

Therefore, a television receiver such that while the user is watching a broadcasting-program, such a program is always recorded on a recording medium is considered. In such a television receiver, even if there is a sudden telephone call or someone suddenly comes, such a program can be traced back and reproduced and he does not overlook the program. Such a program can be easily preserved and even if a program which the user wants to record suddenly starts, it is possible to cope with it.

As a recording medium in the television receiver such that a program is always recorded onto a recording medium as mentioned above, a hard disk drive can be used. Hitherto, as a recording medium for recording a video signal, a magnetic tape is widely used. However, an accessing speed of the magnetic tape is slow and it is difficult to use it as a recording medium that is used in such a television receiver. Although the use of a semiconductor memory is considered, the semiconductor memory of a large capacity is very expensive. In the semiconductor memory, if a power source is turned off, the preserved program is erased, so that it is inconvenient in case of preserving a program for a long time. On the other hand, in the hard disk drive, a capacity is large and an accessing speed is also high enough.

FIG. 6 shows an example of a construction of a video/audio recording and reproducing apparatus which is used in a television receiver such that a program is always recorded on a recording medium. For example, a video signal obtained on the basis of a received television broadcasting (real-time broadcasting) radio wave is supplied to a terminal 200. An audio signal is supplied to a terminal 201. The video signal supplied to the terminal 200 is converted into a digital signal by an A/D converting circuit 202 and is subjected to a decimation, a compression encoding, and the like in a video compressing circuit 203. In this example, a decimation ratio is set to 1/4. Video data outputted from the video compressing circuit 203 is temporarily stored in a buffer memory 204.

Similarly, the audio signal supplied to the terminal 201 is converted into a digital signal by an A/D converting circuit 208 and is compressed and encoded by an audio compressing circuit 209. A decimation on a field unit basis is not performed to the audio signal. Audio data outputted from the audio compressing circuit 209 is temporarily stored into a buffer memory 210.

On the basis of a control of a recording/reproduction controller 207, the video data and audio data temporarily stored in the buffer memories 204 and 210 are read out and are written into a hard disk drive 206 through a bus 205.

The video data and audio data written into the hard disk drive 206 are read out on the basis of the control of the recording/reproduction controller 207. The video data is temporarily stored into a buffer memory 211 and the audio data is temporarily stored into a buffer memory 216.

The compression and encoding of the video data read out from the buffer memory 211 is released by a video decompressing circuit 212 and the resultant video data is converted into an analog signal by a D/A converting circuit 213. The video signal outputted from the D/A converting circuit 213 is supplied to a terminal 214A of a switching circuit 214. Similarly, the compression and encoding of the audio data read out from the buffer memory 216 are released by an audio decompressing circuit 217 and the resultant audio data is converted into an analog signal by a D/A converting circuit 218. The audio signal outputted from the D/A converting circuit 218 is supplied to a terminal 219A of a switching circuit 219.

The video signal is supplied from the input terminal 200 to a terminal 214B of the switching circuit 214. The audio signal is supplied from the input terminal 201 to a terminal 219B of the switching circuit 219. The switching operations of the switching circuits 214 and 219 are controlled by the recording/reproduction controller 207. The signals by the real-time broadcasting supplied from the input terminals 200 and 201 and the reproduction signal read out from the hard disk drive 206 are selectively switched. Outputs of the switching circuits 214 and 219 are led to output terminals 215 and 220 and are reproduced by a CRT monitor apparatus and a speaker, respectively.

The writing operation of the data to the hard disk drive 206 is executed on a unit basis of one set of data in which the video data of one field and the audio data corresponding to four continuous fields in which the video data is set to the head are combined. FIG. 7 shows an example of one set of data comprising the audio data and the video data. The audio data of four continuous fields is stored to the head and, after that, the corresponding video data of one field is stored. The data of each set is time-sequentially continuously arranged for addresses in the hard disk drive 206, respectively.

The writing and reading operations of the data to/from the hard disk drive 206 are executed as follows. FIG. 8 shows an example of a disk accessing method in a one-time speed reproducing mode. As shown in FIGS. 8A and 8B, the video and audio signals are supplied to the terminals 200 and 201, respectively. Each delimiter corresponds to one field. The supplied video and audio signals are converted into the video data and audio data through the foregoing predetermined processes. The video data is written into the buffer memory 204 and the audio data is written into the buffer memory 210.

When time corresponding to four fields of signals a0 to a3 elapses, as shown in an example in FIG. 8C, the audio data (collectively, referred to as audio data e0) obtained by compressing and encoding audio signals b0 to b3 corresponding to first four fields of the input audio signal is written into a predetermined area on the disk 206. Video data a0 based on first one field in a period of time of the signals a0 to a3 of the corresponding input video signal of four fields is written into a subsequent address. Consequently, one set of data comprising the audio data and the video data is written.

Similarly, the writing of the next one set of data is performed with the elapse of time of four fields of signals a4 to a7. In this example, the writing of the next one set of data is executed subsequently to the address of the video data a0.

In the case where the terminals 214B and 219B are selected by the switching circuits 214 and 219, respectively, only the video and audio signals by the real-time broadcasting are transferred to the output terminals 215 and 220 and are reproduced by the monitor apparatus and speaker, respectively. In a monitor output of FIG. 8G, the video signals a0 to a6 and corresponding audio signals b0 to b6 correspond to them.

The reading operation of the data from the hard disk drive 206 will now be described. First, a case of the one-time speed reproduction, namely, the reproduction at a normal speed will now be described. When the one-time speed reproduction is designated, the reading operation of the data from the hard disk drive 206 is started. It is now assumed that the reproduction from a time point that was traced back by only predetermined time t0 is designated. On the addresses in the hard disk drive 206, the address in which the corresponding data has been written is accessed.

The terminals 214B and 219B are selected in the switching circuits 214 and 219 at first, respectively.

When reading out from the hard disk drive 206, time that is required for the disk access is considered. In this example, as shown in FIG. 8D, time t is provided between the writing operation and the reading operation. The time t in the writing operation and the time t in the reading operation don't need to be equal to each other. First, the audio data is read out and written into the buffer memory 216. Subsequently, the video data is read out and written into the buffer memory 211.

For example, in the example shown in FIG. 8D, first, audio data f0 is read out and written into the buffer memory 216. Subsequently, video data c0 is read out and written into the buffer memory 211. Synchronously with the next field in which the writing has been finished, the data is read out from the buffer memories 211 and 216.

The video data c0 read out from the buffer memory 211 is supplied to the video decompressing circuit 212 and the compression and encoding are released in a real-time manner, so that the video data is decompressed. The reading and decompression of the video data c0 from the buffer memory 211 are repetitively executed every field for a period of time of four fields. Thus, for instance, as shown in FIG. 8E, the video data c0 as much as four fields is repeated and, subsequently, video data c4 as much as four fields is repeated. The decompressed video data c0 is converted into an analog video signal through the D/A converting circuit 213 and is supplied to the input terminal 214A of the switching circuit 214.

The reading operation of the audio data f0 from the buffer memory 216 is performed synchronously with the reading of the video signal. The audio data f0 read out from the buffer memory 216 is supplied to the audio decompressing circuit 217 and the compression and encoding are released in a real-time manner, so that the audio data is decompressed. Thus, as shown in FIG. 8F, the continuous audio data is obtained every field. The decompressed audio data f0 (audio data d0 to d3) is converted into an analog audio signal through the D/A converting circuit 218 and is supplied to the input terminal 219A of the switching circuit 219.

Synchronously with the start of the decompressing operation of the video decompressing circuit 212 or audio decompressing circuit 217, on the basis of the control of the recording/reproduction controller 207, the terminals 214A and 219A are selected in the switching circuits 214 and 219, respectively. Thus, in place of the video signal and audio signal by the real-time broadcasting which were supplied from the input terminals 200 and 201 to the terminals 214B and 219B of the switching circuits 214 and 219, the video signal and audio signal which had already been written and recorded to the hard disk drive 206 in the past are transferred to the output terminals 215 and 220 (FIG. 8G).

The writing and reading operations to/from the hard disk drive 206 as mentioned above are alternately performed. That is, at a time point when the time corresponding to four fields elapses from the start of the previous writing (audio data e0 and video data a0), the reading of the audio data f0 and video data c0 mentioned above has already been finished. Therefore, the writing of the next data (audio data e4 and video data a4) supplied from the input terminals 200 and 201 is executed by processes similar to those mentioned above. When the writing is finished, the next data (audio data f4 and video data c4) is read out after waiting for time t.

FIG. 9 conceptually shows the data recorded in the hard disk drive 206 as mentioned above. In the data, one set is constructed by the audio data of four fields and the video data of one field, and this set is time-sequentially written (FIG. 9A). In the reading of the data, for example, in case of the foregoing one-time speed reproduction, as shown in FIG. 9B in accordance with the order of A, B, C, . . . , the data is time-sequentially read out every set of the audio and video data.

In such a data arrangement, if the writing and reading operations of the data are executed in parallel as mentioned above, there is a case where the address of the data which is read out and was recorded in the past and the address in which new data is written are away from each other. For instance, there is a possibility such that those addresses are away to the inner rim and outer rim of the disk. In such a case, every transition from the writing to the reading or every transition from the reading to the writing, seeking time and rotation waiting time of the disk are necessary. The foregoing time t provided between the writing and the reading is provided to assure the seeking time and rotation waiting time of the disk.

The double-speed reproduction will now be described. FIG. 10 shows an example of a disk accessing method in the double-speed reproduction. It will be obviously understood that even in case of the double-speed reproduction, since the writing of the data into the hard disk drive 206 is executed substantially in the same manner as that in case of the one-time speed reproduction mentioned above as shown in FIG. 10C, its description is omitted here. The supply of the input video signal and the input audio signal is, also executed in a manner similar to the case of the one-time speed reproduction as shown in FIGS. 10A and 10B.

In case of the double-speed reproduction, the data is read out from the hard disk drive 206 every other set of data comprising the audio data as much as four fields and the video data as much as one field. That is, as shown in an example of FIG. 10D, when one set of data comprising the audio data f0 and video data c0 is read out, one set comprising the audio data f4 and video data c4 that is time-sequentially located at the next position is jumped over and another set comprising audio data f8 and video data c8 locating at the next position is read out. In the example of FIG. 9, as shown in FIG. 9C, the sets of data are sequentially read out every other set in accordance with the order of A, B, and C.

Outputs based on the data read out every other set are shown in FIGS. 10E and 10F. As shown in FIG. 10E, in an output video image, the data c0 of one field is repeated by an amount corresponding to four fields. Subsequently, the data c8 is repeated by an amount corresponding to four fields. Thus, the double-speed reproduction is realized.

However, as for an output sound, as shown in FIG. 10F, after the data d0 to d3 as much as four fields was continuously outputted, data d8 to d11 is subsequently outputted. That is, after the data d3, the data d8 locating at the position which is ahead by a distance of four fields is outputted. Therefore, the continuity of the audio signal is not held in the portion of one set of data which was jumped over. There is, consequently, a problem such that the sound has to be erased for a period of time during which the double-speed reproduction is executed.

DISCLOSURE OF INVENTION

It is, therefore, an object of the invention to provide a video/audio signal recording and reproducing apparatus and its method in which, for example, when audio and video signals by a real-time broadcasting are always recorded to a recording medium and the recorded signal is read out and reproduced in parallel with the recording, even if a double-speed reproduction is executed, a continuity of an output sound can be held.

To solve the above problem, according to the invention, there is provided a video/audio recording and reproducing apparatus comprising:

a recording medium for recording an audio signal and a video signal; and recording medium control means for controlling so as to execute the recording to the recording medium and a reproduction from the recording medium in parallel, wherein the recording medium control means further controls in a manner such that the audio signal and video signal in a predetermined period of time are recorded as one set, one set of audio signal and video signal is reproduced every (n−1) sets, and the audio signal in a predetermined period of time subsequent to the audio signal which is reproduced is also reproduced.

According to the invention, there is also provided a video/audio recording and reproducing method comprising:

a step of recording an audio signal and a video signal to a recording medium; and a recording medium control step of controlling so as to execute the recording to the recording medium and a reproduction from the recording medium in parallel, wherein in the recording medium control step, there is further executed a control in a manner such that the audio signal and video signal in a predetermined period of time are recorded as one set, one set of audio signal and video signal is reproduced every (n−1) sets, and the audio signal in a predetermined period of time subsequent to the audio signal which is reproduced is also reproduced.

As mentioned above, according to the invention, upon reproduction, the video signal in a predetermined period of time is reproduced every (n−1) signals and, as for the audio signal, both of the audio signal which is reproduced in correspondence to the video signal which is read out and the audio signal in a predetermined period of time subsequent to the reproduced audio signal are reproduced. Thus, an n-times speed reproduction can be performed without interrupting the sound.

BRIEF DESCRIPTION OF DRAWINGS

FIG. 1 is a schematic diagram showing an embodiment of the invention;

FIGS. 8A to 8G are schematic diagrams showing an example of a disk accessing method in a one-time speed reproduction;

FIGS. 10A to 10G are schematic diagrams showing an example of a disk accessing method in the double-speed reproduction.

BEST MODE FOR CARRYING OUR THE INVENTION

Figure 2:
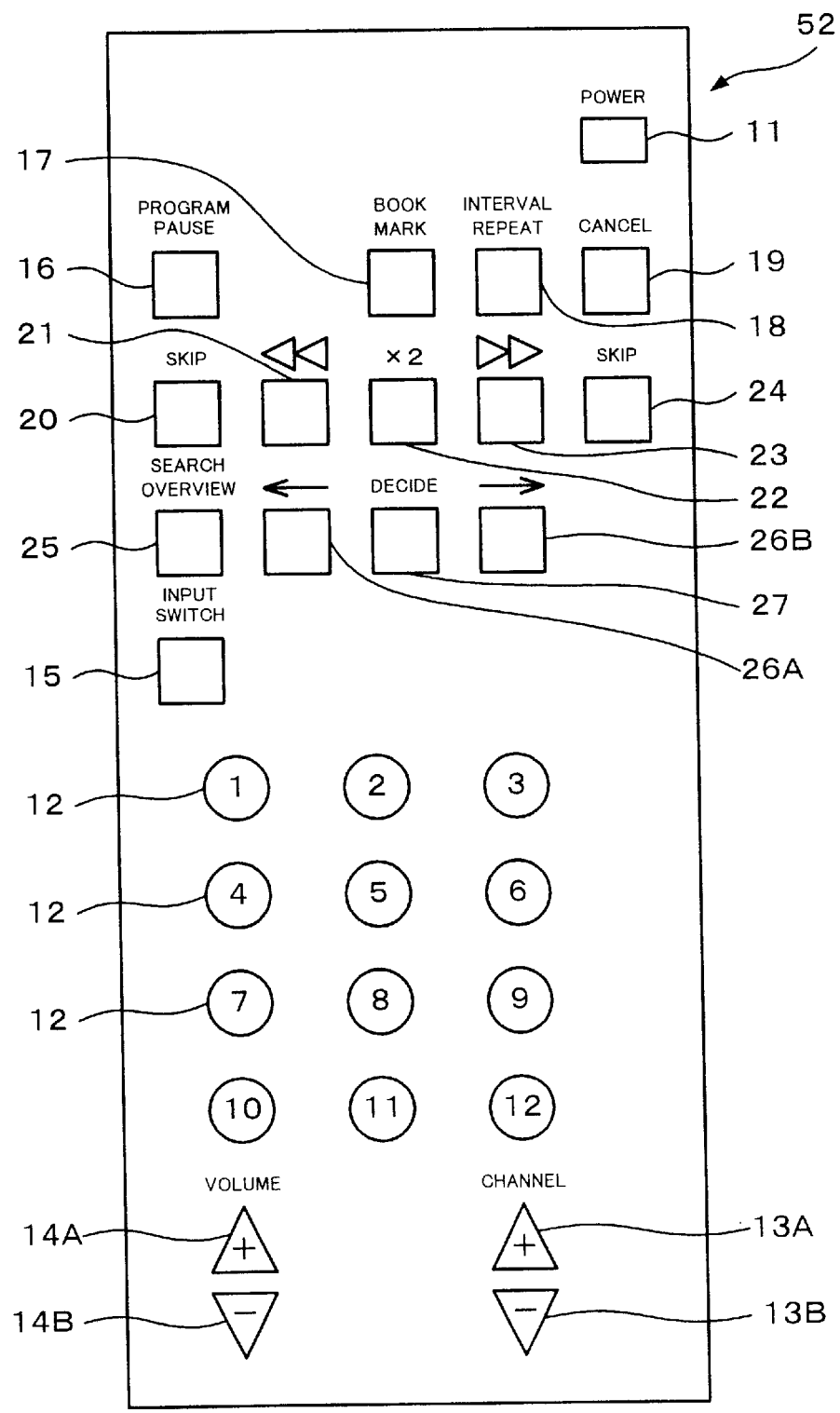
FIG. 2 is a schematic diagram showing an example of a construction of a remote commander to operate a television receiver.

An embodiment of the invention will now be described hereinbelow with reference to the drawings. FIG. 1 shows the embodiment of the invention. In FIG. 1, reference numeral 1 denotes a television receiver to which the invention is applied and 2 indicates a remote commander to operate the television receiver 1. A video image is displayed on a picture plane 3. A hard disk drive unit 4 is built in the television receiver 1. A program which is being received by the television receiver 1 is always recorded in the hard disk drive unit 4. In such a television receiver having the hard disk drive unit 4, it is possible to trace back and reproduce an overlooked scene or a scene which the user wants to again see or to record and reproduce a desired program.

FIG. 2 shows an example of a construction of the remote commander 2 for operating the television receiver 1. Various keys for performing fundamental settings of the television receiver 1 are arranged. That is, a power switch 11 to turn on/off a power source of the television receiver 1, channel keys 12, 12, 12, . . . to set a channel, channel up/down keys 13A and 13B, volume up/down keys 14A and 14B, and an input source change-over switch 15 are arranged.

Further, as various keys for controlling the hard disk drive unit 4 of the television receiver 1, a program pause key 16, a bookmark record key 17, an interval repeat key 18, a cancel key 19, a reverse rotation skip play key 20, a reverse rotation high speed feed key 21, a double-speed key 22, a forward rotation high speed feed key 23, a forward rotation skip key 24, an overview search key 25, arrow keys 26A and 26B, and a decide key 27 are arranged for the remote commander 2 to operate the television receiver 1 to which the invention is applied.

When the program pause key 16 is depressed, the picture plane which is being received is stopped at this time point and is displayed as a still image. For this period of time, the program is recorded in the hard disk drive unit 4 of the television receiver 1. When the program pause key 16 is again pressed, the program recorded in the hard disk drive 4 is reproduced from the scene displayed as a still image.

When the bookmark record key 17 is pressed, the program which is being broadcasted in this instance can be preserved in the hard disk drive unit 4 of the television receiver 1.

A repeat reproduction is set by the interval repeat key 18. When the interval repeat key 18 is first depressed, a start position of repetition is set. When the interval repeat key 18 is subsequently pressed, an end position of the repetition is set.

The cancel key 19 is pressed when the set operation or function is cancelled.

The reverse rotation skip play key 20, reverse rotation high speed feed key 21, double-speed key 22, forward rotation high speed feed key 23, and forward rotation skip key 24 are keys to perform a variable speed reproduction. When the double-speed key 22 is pressed during the reproduction of the program recorded in the hard disk drive unit 4, the program is reproduced at a double speed. By again pressing the key 22, the operating mode is returned to the reproduction at a normal speed. While the forward rotation high speed feed key 23 is pressed, the reproduction is executed at a further high speed. When the forward rotation skip key 24 is pressed, the reproduction video image is skipped. While the reverse rotation high speed feed key 21 is pressed, the reverse rotation reproduction is performed at a high speed. When the reverse rotation skip play key 20 is pressed, the reproduction video image is skipped in the reverse rotating direction.

The overview search key 25, arrow keys 26A and 26B, and decide key 27 are used to search a program. When the overview search key 25 is pressed, the picture plane 3 of the television receiver 1 is divided into the center picture plane and a plurality of peripheral small picture planes. The picture planes of every predetermined time among the picture planes recorded in the hard disk drive are displayed in the peripheral small picture planes. By the operations of the arrow keys 26A and 26B, when a desired picture plane is selected from a plurality of picture planes and a desired scene is searched, the decide key 27 is pressed. When the decide key 27 is pressed, the reproduction is started from the selected picture plane.

Figure 3:
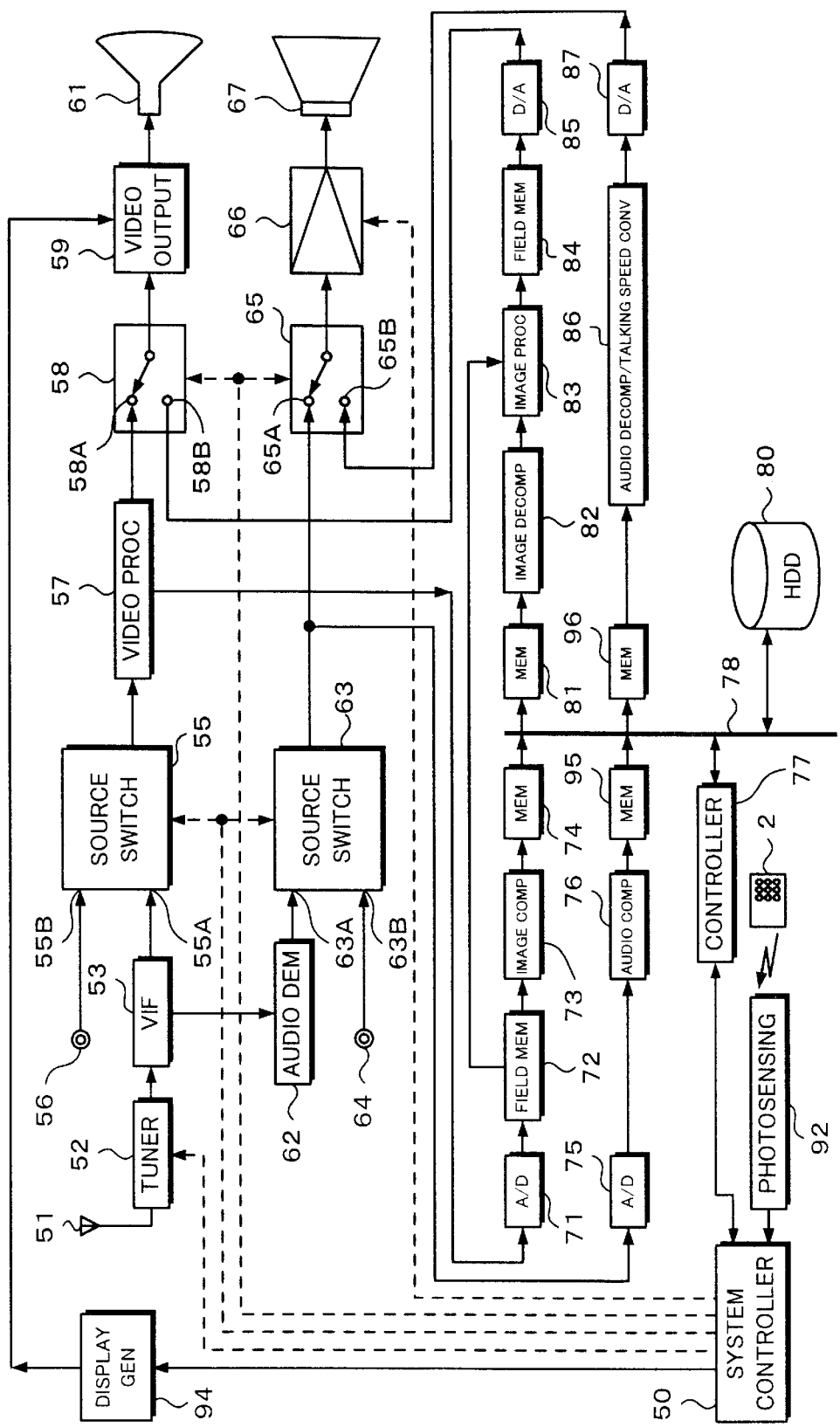
FIG. 3 is a block diagram showing an example of a construction of a television receiver to which the invention is applied.

FIG. 3 shows an example of a construction of the television receiver 1 to which the invention is applied. In FIG. 3, a reception signal received by an antenna 51 is supplied to a tuner circuit 52. A channel set signal is supplied from a system controller 50 to the tuner circuit 52. In the tuner circuit 52, the signal of a desired reception channel is selected on the basis of the channel set signal and this signal is converted into an intermediate frequency signal.

An output of the tuner circuit 52 is supplied to a video intermediate frequency circuit 53. In the video intermediate frequency circuit 53, the intermediate frequency signal from the tuner circuit 52 is amplified and this signal is video detected. Thus, for example, a composite video signal of the NTSC system is obtained. The video signal is supplied to one input terminal 55A of a video source change-over switch 55. The audio signal is detected from a beat component of, for instance, 4.5 MHz in an output of the intermediate frequency circuit 53. This output is supplied to an audio demodulating circuit 62.

A video signal from an external video input terminal 56 is supplied to another input terminal 55B of the video source change-over switch 55. A selection signal is supplied from the system controller 50 to the video source change-over switch 55. The video signal based on the received television broadcasting and the video signal from the external video input terminal 56 are switched by the video source change-over switch 55.

An output of the video source change-over switch 55 is supplied to a video signal processing circuit 57. By the video signal processing circuit 57, a luminance signal Y and a chroma signal C are separated from a composite video signal of the NTSC system. Further, color difference signals U and V are demodulated from the chroma signal C. Component video signals Y, U, and V are formed. The component video signals Y, U, and V are supplied to a terminal 58A of a switching circuit 58 and to an A/D converter 71. An output of a D/A converter 85 is supplied to another input terminal 58B of the switching circuit 58.

The switching circuit 58 is used to switch a picture plane based on received television broadcasting or the video signal from the external video input terminal 56 and a reproduction picture plane from a hard disk drive 80 (corresponding to the hard disk drive unit 4). The switching circuit 58 is controlled by a recording/reproduction controller 77. That is, a control signal from the recording/reproduction controller 77 is supplied to the switching circuit 58 through the system controller 50. In case of displaying the picture plane based on the received television broadcasting or the video signal from the external video input terminal 56, the switching circuit 58 is switched to the terminal 58A side. In case of displaying a reproduction picture plane from the hard disk drive 80, the switching circuit 58 is switched to the terminal 58B side.

An output of the switching circuit 58 is supplied to a video output circuit 59. The video output circuit 59 has: a matrix circuit to form three primary color signals R, G, and B from the component video signals Y, U, and V from the switching circuit 58; and a video amplifying circuit to drive the three primary color signals R, G, and B and supply to a color image receiving tube 61. In the video output circuit 59, the component video signals Y, U, and V from the switching circuit 58 are converted to the three primary color signals R, G, and B and are supplied to the color image receiving tube 61.

The audio signal detected from the beat component of, for example, 4.5 MHz of the output of the intermediate frequency circuit 53 is supplied to the audio demodulating circuit 62. The audio signal is demodulated by the audio demodulating circuit 62. The audio signal is supplied to an input terminal 63A of an audio source change-over switch 63.

An audio signal from an external audio input terminal 64 is supplied to another terminal 63B of the audio source change-over switch 63. The audio signal based on the received television broadcasting and the audio signal from the external audio input terminal 64 are selected by the audio source change-over switch 63.

An output of the audio source change-over switch 63 is supplied to a terminal 65A of a switching circuit 65 and is supplied to an A/D converter 75. An output of a D/A converter 87 is supplied to another input terminal 65B of the switching circuit 65.

The switching circuit 65 switches an audio signal from the received television broadcasting or the external audio input terminal 64 and an audio signal reproduced from a hard disk drive 80. The switching circuit 65 is controlled by the recording/reproduction controller 77. That is, a control signal from the recording/reproduction controller 77 is supplied to the switching circuit 65 through the system controller 50. In case of outputting the audio signal from the received television broadcasting or the external audio input terminal 64, the switching circuit 65 is switched to the terminal 65A side. In case of outputting the audio signal from the hard disk drive 80, the switching circuit 65 is switched to the terminal 65B side.

The output of the switching circuit 65 is supplied to an audio amplifier 66. The audio signal from the switching circuit 65 are amplified by the audio amplifier 66. The audio signal is supplied to a speaker 67.

The component video signals Y, U, and V from the video signal processing circuit 57 is supplied to the A/D converter 71. In the A/D converter 71, the component video signals from the video signal processing circuit 57 are converted to digital signals. An output of the A/D converter 71 is supplied to the field memory 72. In the embodiment, the video data is decimated at a decimation ratio of 1/4. Therefore, the video data is written into a field memory 72 every four fields.

An output of the field memory 72 is supplied to an image compressing circuit 73. In the image compressing circuit 73, the component video signals are compressed. For example, a motion JPEG is used as an image compressing system. The video data compressed by the image compressing circuit 73 is temporarily written into a buffer memory 74 comprising, for example, an FIFO (First-In, First-Out).

The audio signal from the audio source change-over switch 63 is supplied to the A/D converter 75. In the A/D converter 75, the audio signal from the audio source change-over switch 63 is converted to a digital signal. An output of the A/D converter 75 is supplied to an audio compressing circuit 76. In the audio compressing circuit 76, the audio signal is compressed. For example, a non-linear PCM is used as an audio compressing system. The audio signal compressed by the audio compressing circuit 76 is temporarily written into a buffer memory 95 comprising, for instance, an FIFO.

The video data and the audio data are read out from the buffer memories 74 and 95 on the basis of a control of the recording/reproduction controller 77. The read-out data is written into the hard disk drive 80 through a bus 78.

Figure 7:
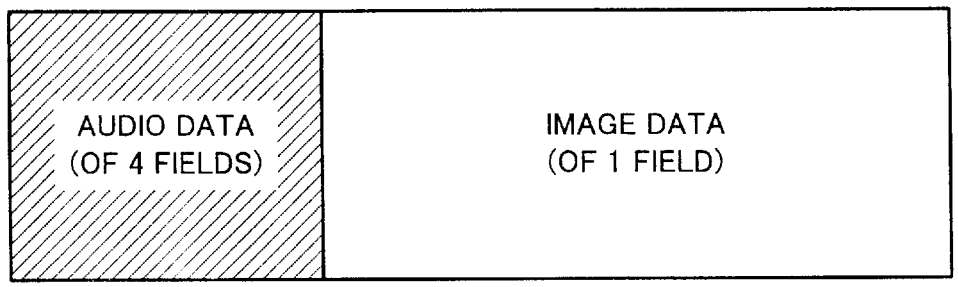
FIG. 7 is a schematic diagram showing an example of one set of data comprising audio data and video data.
Figures 9A, 9B, 9C:
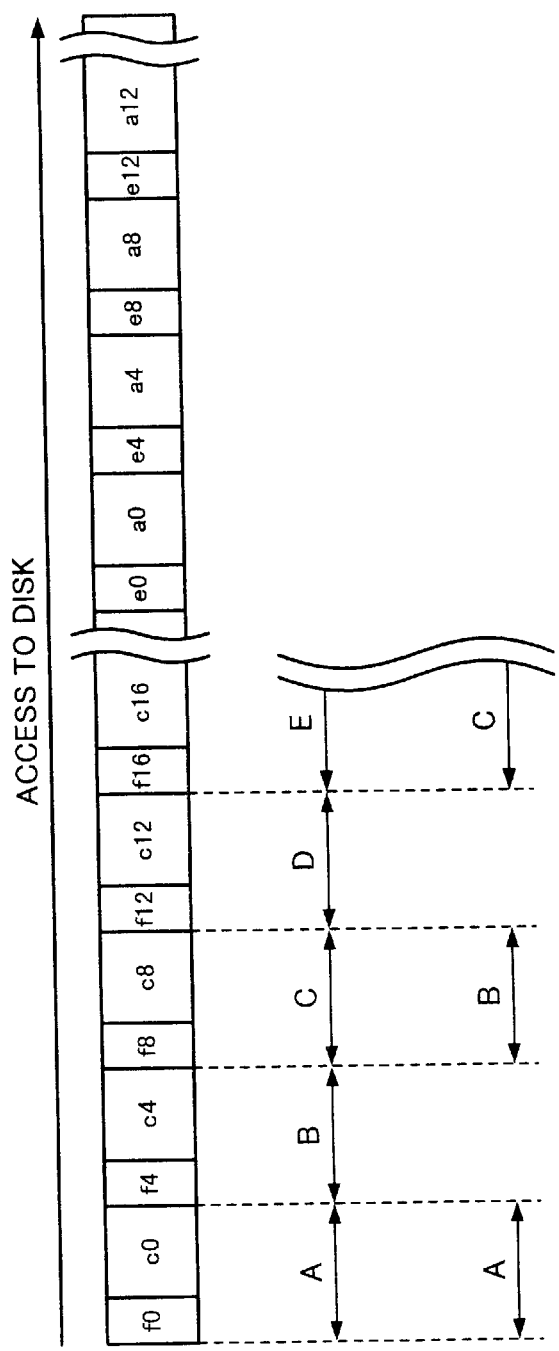
FIGS. 9A to 9C are conceptual diagrams showing data written and recorded in a hard disk drive.

The writing of the data to the hard disk drive 80 is performed on a unit basis of one set of data constructed by combining the decimated video data as much as one field and the audio data as much as four continuous fields in which the video data is set to the head as mentioned above by using FIG. 7. The audio data of four continuous fields is stored at the head and the corresponding video data as much as one field is stored after the audio data. The data of each set is respectively time-sequentially continuously arranged in addresses of the hard disk drive 80.

The video data and audio data recorded in the hard disk drive 80 are reproduced on the basis of a control of the recording/reproduction controller 77. The audio data which has been read out and reproduced from the hard disk drive 80 is temporarily written into a buffer memory 96 comprising, for example, an FIFO. Similarly, the video data which has been read out and reproduced from the hard disk drive 80 is temporarily written into a buffer memory 81 comprising, for example, an FIFO through the bus 78.

The video data is read out from the buffer memory 81 on the basis of the control of the recording/reproduction controller 77. Since the video data has been decimated at the decimation ratio of 1/4, the same data is repetitively read out from the buffer memory 81 for a period of time of four fields. The read-out video data is supplied to an image decompressing circuit 82. In the image decompressing circuit 82, the component video data Y, U, and V are formed from the video data compressed by, for example, the motion JPEG. An output of the image decompressing circuit 82 is supplied to the D/A converter 85 through an image processing circuit 83 to form a multi-screen and a field memory 84. In the D/A converter 85, the digital video signal is converted to an analog video signal. An output of the D/A converter 85 is supplied to the terminal 58B of the switching circuit 58.

The audio data is read out from the buffer memory 96 on the basis of the control of the recording/reproduction controller 77. The read-out audio data is supplied to an audio decompressing/talking speed converting circuit 86. An output of the audio decompressing/talking speed converting circuit 86 is supplied to the D/A converter 87. The digital audio signal is converted to an analog audio signal by the D/A converter 87. An output of the D/A converter 87 is supplied to the terminal 65B of the switching circuit 65.

The system controller 50 performs a whole control of the television receiver 1. The system controller 50 and recording/reproduction controller 77 are bidirectionally connected.

An input is supplied from the remote commander 2 to the system controller 50 through a photosensing unit 92. Various kinds of operations are set on the basis of the input from the remote commander 2. The output of the system controller 50 is supplied to a display generating circuit 94. A display signal showing various operation setting states is generated from the display generating circuit 94. An output of the display generating circuit 94 is supplied to the video output circuit 59 and the various operating states are displayed on the screen.

An accessing method to the hard disk drive 80 when the double-speed reproduction is executed according to the invention will now be described. Since the writing and the reading at the one-time speed are substantially the same as those of the method described by using FIG. 10, they are omitted.

In the invention, when the double-speed reproduction is executed, the audio data as much as four fields, the video data subsequent to the audio data, and further, the audio data as much as four fields subsequent to the video data are read out as a set.

Figure 4:
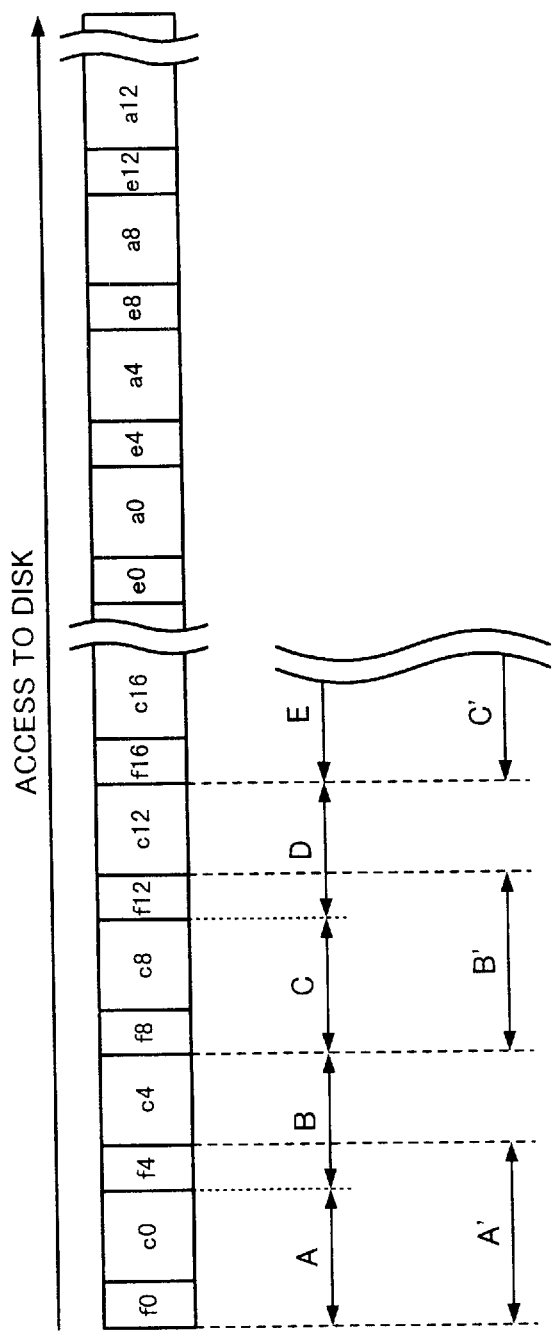
FIGS. 4A to 4C are conceptual diagrams showing the reading operation of data in a double-speed reproduction.

FIG. 4 conceptually shows the reading of the data in the double-speed reproducing mode. As shown as an example in FIG. 4A, in the hard disk drive 80, the video data c0 as much as one field corresponding to the audio data f0 is arranged subsequently to the audio data f0 as much as four continuous fields. The audio data f4 as much as next four fields is arranged subsequently to the video data c0. Further, the video data c4 corresponding to the audio data f4 is arranged subsequently to the audio data. In a manner similar to the above, the data of each set comprising the audio data as much as four fields and the corresponding video data as much as one field is respectively time-sequentially continuously arranged. In the reproduction at the one-time speed, as shown in FIG. 4B, the data is sequentially continuously read out by using such one set as a unit like A, B, C, . . . .

In the double-speed reproduction, as shown in FIG. 4C, for example, subsequently to one set of data comprising the audio data f0 and video data c0, the next set of audio data f4 is further read out. At the time of the next reading, the video data c4 which forms one set together with the audio data f4 is jumped and the next set of data, namely, the audio data f8 and video data c8 are read out. Further, subsequently, audio data f12 of the next set is read out. As mentioned above, according to the invention, in the double-speed reproduction, the video data is read out every other data like A', B', C', . . . and the audio data is continuously read out.

Figure 5:
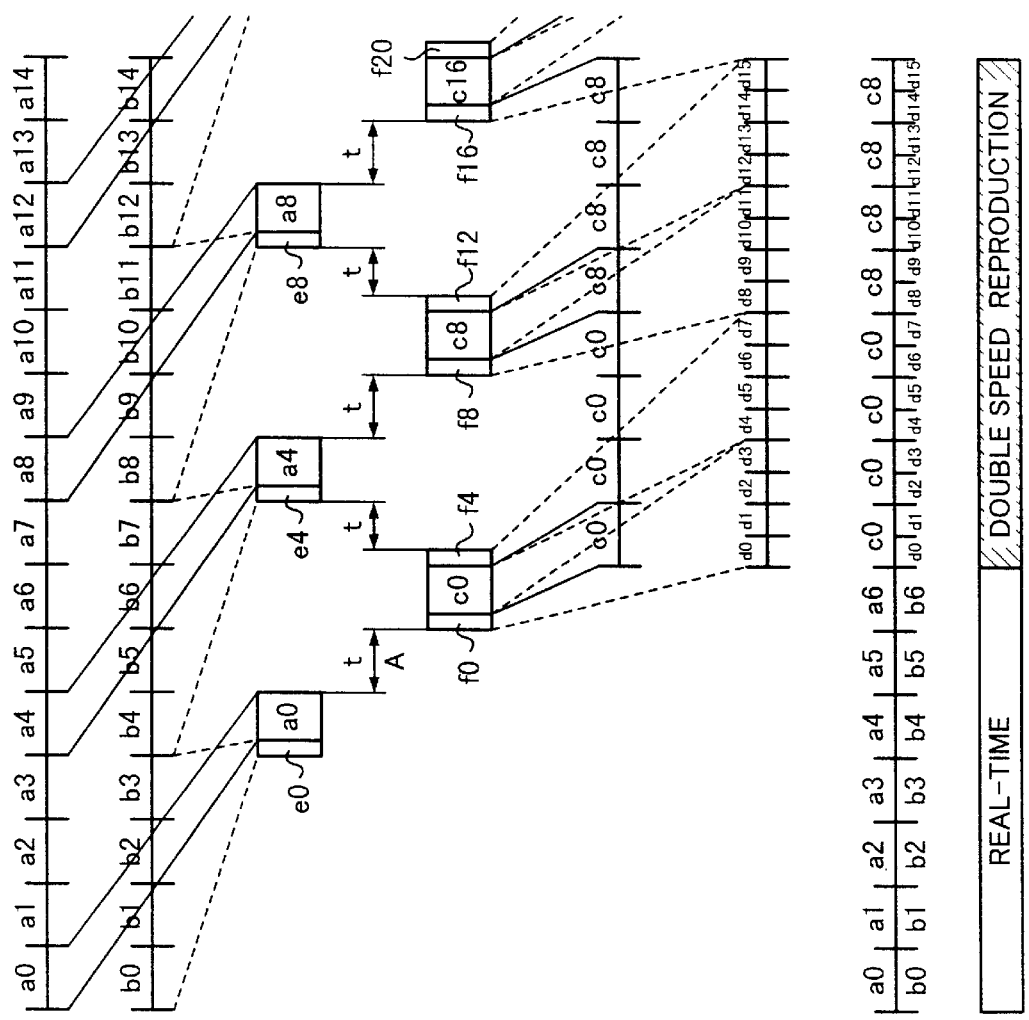
FIGS. 5A to 5G are schematic diagrams showing an example of a disk accessing method in the double-speed reproduction.
Figure 6:
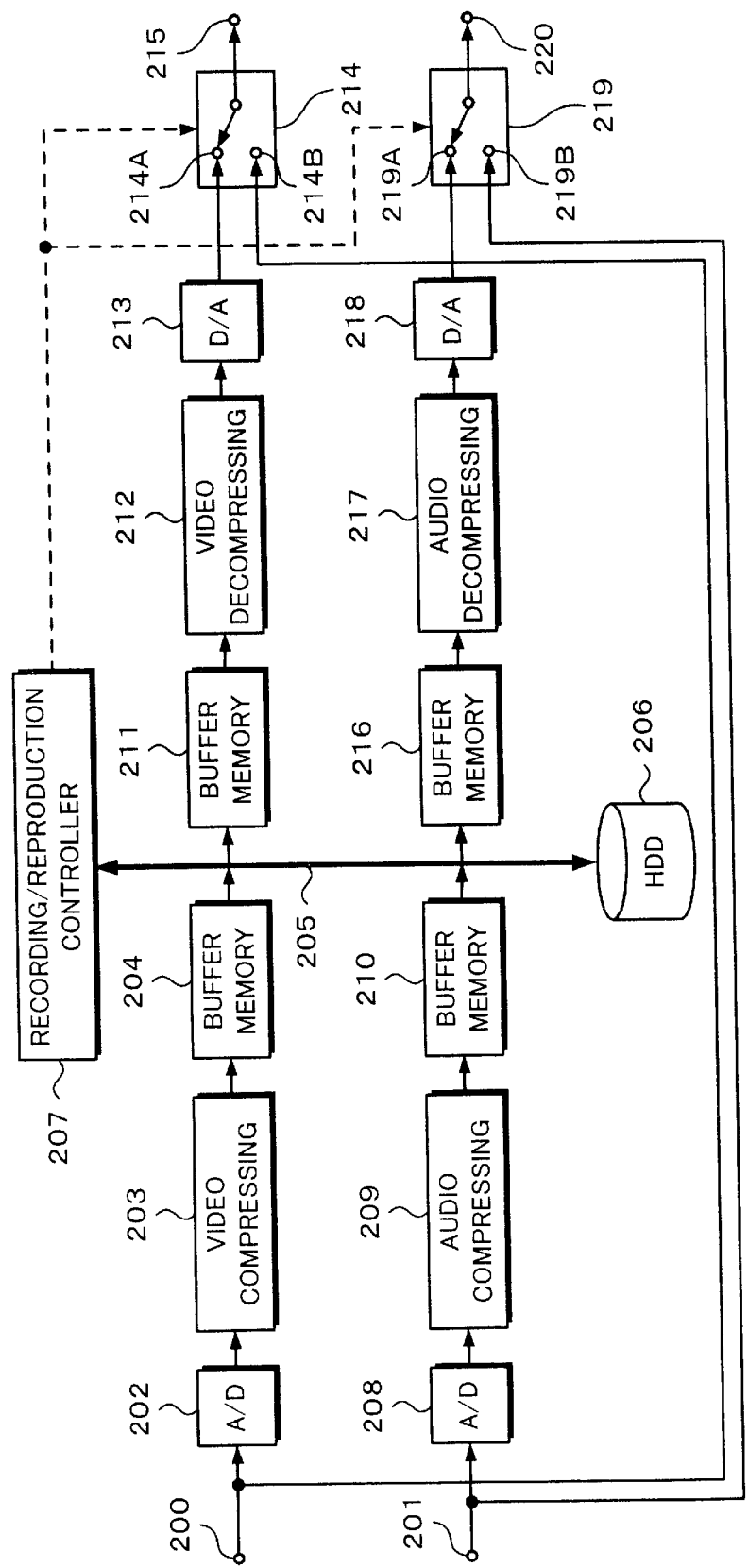
FIG. 6 is a block diagram showing an example of a construction of a video/audio recording and reproducing apparatus which is used in a television receiver such that a program is always recorded to a recording medium.

FIG. 5 shows an example of the disk accessing method in the double-speed reproduction. It will be obviously understood that the supply of the input video signal and the input audio signal is substantially the same as that in case of the one-time speed reproduction as shown in FIGS. 5A and 5B.

The writing and reading of the data to/from the hard disk drive 80 in the double-speed reproduction are executed as follows. As shown in FIGS. 5A and 5B, the video signal and audio signal are supplied to the A/D converters 71 and 75, respectively. Each delimiter corresponds to one field. The supplied video and audio signals are converted to the video data and audio data through the foregoing predetermined processes, the video data is written into the buffer memory 74, and the audio data is written into the buffer memory 95, respectively.

When the time corresponding to four fields until the signals a0 to a3 elapses, as shown in FIG. 5C as an example, the audio data (collectively referred to as audio data e0) in which the audio signals b0 to b3 as much as first four fields of the input audio signal have been compression encoded is written into a predetermined area of the disk 80. The video data a0 based on first one field in the period of time of the signals a0 to a3 of the corresponding input video signal of four fields is written into the subsequent address. One set of data comprising the audio data and video data is written.

Similarly, the writing of the next one set of data is performed after waiting for the elapse of the time corresponding to four fields until the signals a4 to a7. In this example, the writing of the next set of data is performed subsequently to the address of the video data a0.

When the terminals 58A and 65A are selected in the switching circuits 58 and 65, respectively, the video and audio signals by the real-time broadcasting are outputted to the color image receiving tube 61 and speaker 67. In a monitor output of FIG. 5G, the video signals a0 to a6 and the corresponding audio signals b0 to b6 correspond to them.

The reading-of the data from the hard disk drive 80 will now be described. For example, by pressing the double-speed key 22 of the remote commander 2, the double-speed reproduction is designated. In this example, at the position shown at time point A in FIG. 5, it is assumed that the mode is designated so as to double-speed reproduce the data from the position that is traced back by a distance corresponding to only time t0.

The instruction of the double-speed reproduction is supplied to the recording/reproduction controller 77 through the system controller 50 and the reading of the data from the hard disk drive 80 is started. On the addresses of the hard disk drive 80, the address in which the corresponding data was written, namely, the address where the writing operation was performed at the time that is traced back by only time t0 is accessed.

The reading from the hard disk drive 80 is performed in consideration of the time that is required for the disk access. In this example, as shown in FIG. 5D, the time t is provided between the writing and the reading. As for the time t, the time between the writing and the reading and the time between another writing and another reading do not need to be equal. The read-out audio data and video data are written into the buffer memories 96 and 81, respectively.

For example, in the example shown in FIG. 5D, first, the audio data f0 is read out and written into the buffer memory 96. Subsequently, the video data c0 is read out and written into the buffer memory 81. Subsequently to the reading of the video data c0, the next set of audio data f4 is further read out. The read-out audio data f4 is written into the buffer memory 96. The video data c0 is read out from the buffer memory 81 synchronously with the next field after completion of the writing of the video data to the buffer memory 81.

Upon reading at the double speed, the access time for the disk is longer than that in case of the foregoing one-speed reading by only the time corresponding to the audio data f4 that is read out subsequently to the video data c0. However, since the size of audio data is sufficiently smaller than that of the video data, no problem occurs with respect to the assurance of the time t that is required for the disk access.

The video data c0 read out from the buffer memory 81 is supplied to the image decompressing circuit 82, the compression and encoding are released in a real-time manner, and the data is decompressed. The reading of the video data c0 from the buffer memory 81 and the decompression are repetitively executed every field for a period of time of four fields. Thus, for example, as shown in FIG. 5E, the video data c0 is repeated by an amount of four fields. The decompressed video data c0 is supplied to the D/A converter 85 through the image processing circuit 83. The video data c0 is converted into an analog video signal by the D/A converter 85 and is supplied to the terminal 58B of the switching circuit 58.

The reading of the audio data f0 and f1 from the buffer memory 96 is executed synchronously with the video signal. The audio data f0 and f1 read out from the buffer memory 96 are supplied to the audio decompressing/talking speed converting circuit 86, the compression and encoding are released in a real-time manner, the data is decompressed, and the data is further converted into a talking speed.

In case of the double-speed reproduction, the video data c0 is repetitively read out by the amount of four fields. However, the audio data has an amount of eight fields of the audio data f0 and f4. Therefore, the talking speed conversion is executed in order to allow the audio data f0 and f4 as much as eight fields to be reproduced within four fields. The audio decompressing/talking speed converting circuit 86 comprises, for example, a DSP (Digital Signal Processor) and executes the talking speed conversion by executing the decimation of ½ and the filtering process on a sampling unit basis to the supplied audio data.

The audio data f0 and f4 which were decompressed and talking speed converted are converted to analog audio signals through the D/A converter 87 and are supplied to the terminal 65B of the switching circuit 65. Thus, the audio signal in which the data as much as two fields was continuously filled is derived for one field. That is, as shown in FIG. 5F as an example, the audio signals d0 to d3 corresponding to the video signal c0 and the audio signals d4 to d8 corresponding to the next video signal c4 are continuously derived at the double speed.

In the switching circuits 58 and 65, the terminals 58B and 65B are selected on the basis of the control of the recording/reproduction controller 77 synchronously with the start of the decompressing operation of the image decompressing circuit 82 or audio decompressing/talking speed converting circuit 86, respectively. Thus, in place of the video signal and audio signal by the real-time broadcasting which were supplied to the switching circuits 58 and 65 because the terminals 58A and 65A had first been selected, the video signal and audio signal outputted from the D/A converters 85 and 87 are outputted from the switching circuits 58 and 65, respectively. (FIG. 5G)

The writing and reading operations for the hard disk drive 80 as mentioned above are alternately executed. The video data is read out every other data and as for the audio data, the data which are continuously arranged just before and just after the video data is read out.

That is, at a time point when the time corresponding to four fields elapses from the start of the previous writing (audio data e0 and video data a0), the reading operations of the audio data f0 and f4 and the video data c0 mentioned above have already been finished. Therefore, the next data (audio data e4 and video data a4) is written by processes similar to those mentioned above. After completion of the writing, the next data (audio data f8 and f12 and video data cB) is read out after waiting for time t.

By controlling the reading operation in the double-speed reproduction as mentioned above, as shown in FIG. 5G, the audio signal is continuously reproduced at a double speed. That is, the audio data as much as two fields is continuously read out and reproduced for the 1-field period of time. The audio data is continuous and there is no need to erase it even in the double-speed reproduction.

Although the explanation has been made above on the assumption that the present invention is applied to the double-speed reproduction, the invention is not limited to such an example but can be also applied to the n-times speed reproduction such as 3-times speed, 4-times speed, . . . . That is, upon reproduction, the sets of audio data and video data are read out every (n−1) sets. By reading out the audio data from each of the (n−1) sets of data subsequent to the read-out one set of data, the n-times speed reproduction can be performed. The read-out audio data is converted into the talking speed of, for example, 1/n by the audio decompressing/talking speed converting circuit 86. It is desirable to decide the value of n in consideration of the continuity of the audio signal after the talking speed conversion and the timing for accessing to the hard disk drive 80.

As described above, according to the invention, even in the double-speed reproduction, all of the audio data can be read out from the hard disk drive and there is an effect that the continuity of the sound is held. There is, consequently, an effect that the sound can be generated without erasing it even in the double-speed reproduction.

What is claimed is:

1. A video/audio recording and reproducing apparatus comprising:

a recording medium for recording an audio signal and a video signal; and recording medium control means for controlling so as to execute said recording to said recording medium and a reproduction from said recording medium in a substantially simultaneous manner such that audio and video signals reproduced from said recording medium during a substantially simultaneous recording and reproduction operation may be presented to an observer without interruption, characterized in that said recording medium control means further controls in a manner such that said audio signal and said video signal in a predetermined period of time are recorded as one set, said one set of said audio signal and said video signal is reproduced every (n−1) sets, and the audio signal in said predetermined period of time subsequent to said audio signal which is reproduced is also reproduced;

whereby upon high speed reproduction from said recording medium said audio signal is reproduced without discontinuity.

2. A video/audio recording and reproducing apparatus according to claim 1, characterized by further comprising:

converting means for converting the reproduced audio signal at an n-times speed.

3. A video/audio recording and reproducing apparatus according to claim 1, characterized in that an audio signal and a video signal of a television broadcasting which is received are always recorded.

4. A video/audio recording and reproducing method comprising:

a step of recording an audio signal and a video signal onto a recording medium; and a recording medium control step of controlling so as to execute said recording to said recording medium and a reproduction from said recording medium in a substantially simultaneous manner such that audio and video signals reproduced from said recording medium during a substantially simultaneous recording and reproduction operation may be presented to an observer without interruption, characterized in that in said recording medium control step, there is further executed a control in a manner such that said audio signal and said video signal in a predetermined period of time are recorded as one set, said one set of said audio signal and said video signal is reproduced every (n−1) sets, and the audio signal in said predetermined period of time subsequent to said audio signal which is reproduced is also reproduced;

whereby upon high speed reproduction from said recording medium said audio signal is reproduced without discontinuity.

5. A video/audio recording and reproducing method according to claim 4, characterized in that the reproduced audio signal is converted into an n-times speed.

6. A video/audio recording and reproducing method according to claim 4, characterized in that an audio signal and a video signal of a television broadcasting which is received are always recorded.

* * * * *